United States Patent Office 3,378,477
Patented Apr. 16, 1968

3,378,477
PROCESS FOR THE DEPOSITION OF RESINOUS FILMS ON METAL OBJECTS
James Keith Gentles and Jack Blatchley Harrison, Liverpool, England, assignors to Goodlass, Wall & Co., Limited, Liverpool, England, a British company
No Drawing. Filed Feb. 26, 1963, Ser. No. 261,564
Claims priority, application Great Britain, Feb. 27, 1962, 7,677/62
4 Claims. (Cl. 204—181)

ABSTRACT OF THE DISCLOSURE

Bonding of a pigmented resin film on a metal surface by electrodeposition wherein a pigment is first incorporated into a selected synthetic resin having free acid groups and which resin is not soluble in an aqueous medium, and thereafter dispersing the pigmented resin in an aqueous medium in the presence of base to form a stable aqueous dispersion of the pigmented resin. An electrolytic cell is then formed wherein the metal surface to be coated constitutes the anode of the cell. Electrophoresis results in deposition of the pigmented resin on the metal surface. Subsequently, the coated metal surface is heated to achieve crosslinking of the resin which is then bonded to the surface of the metal. Preferably the selected resin is an alkyd resin derived from drying oil fatty acids, polyhydric alcohols and trimellitic anhydride or an acrylic resin which is the copolymer of an acrylamide, an alkyl acrylate, acrylic acid or a methacrylic acid and styrene or vinyl toluene.

The present invention relates to the deposition of a film of pigmented resin on a metal object. In particular, the present invention relates to the electrophoretic deposition of a film of pigmented resin on a metal object from an aqueous dispersion of said resin.

Heretofore, pigmented resins, such as primer-coatings have been applied to metal objects, such as motor car bodies, by means of spraying and dipping techniques which processes are relatively expensive and do not produce an overall uniform coat on the metal object particularly when it has a complex shape.

The present invention provides a process for the coating of pigmented resins, such as primers, on metal objects, which produces an even and smooth coat on the metal object, even when that metal object has a relatively complex configuration and the coat further has excellent adhesion to the metal object.

According to the present invention there is provided a process for the deposition of a film of a pigmented resin on a metal object, which comprises incorporating a pigment into a resin having free acid groups, dispersing the pigmented resin in an aqueous medium containing a base to form an aqueous dispersion of said pigmented resin, forming an electrolytic cell using the metal object as the anode of said cell and subjecting the aqueous dispersion to electrophoresis whereby to deposit the pigmented resin on the metal object as an adherent film.

It is essential for the process of the present invention that the resin is not soluble in the aqueous medium for if soluble pigmented resins were to be used, only the resin is deposited on the surface of the metal object, the pigment to a very large extent being left in the aqueous medium. Again it is essentail that the pigment is incorporated into the resin before it is dispersed in the aqueous medium, for if the resin and the pigment are separately dispersed in the same aqueous medium, it has also been found that only the resin and a portion of the pigment are deposited on the metal object, the pigment to a large extent being left in the aqueous medium. The pigment may be incorporated into the resin before dispersion thereof in the aqueous medium by grinding the pigment in a fairly concentrated solution of the resin in a solvent therefor. Subsequently the mixture is dispersed in the aqueous medium, e.g. water in the presence of a base using a high speed emulsifier.

After deposition of the film on the metal object, the film is insoluble in water and can be rinsed without damage to the film. This coated object may be then heated for a period of time, e.g. stoved, whereby to produce a smooth glossy film of uniform thickness and has extremely good adhesion of the metallic object.

The presence of a base, which is desirably present in an amount equal to or greater than the stoichiometric equivalent of the acidity present in the resin, results in the formation of a stable dispersion, in which the resin particles possess a negative charge, i.e. are anionic. When two metal electrodes are immersed in the aqueous dispersion and a potential difference is applied between said electrodes, electrophoresis occurs, the negatively charged pigmented resin particles migrate to the anode where they lose their charge and are deposited to form an adherent film. Thus, by using the metal object to be coated as the anode, an even deposit of pigmented resin is obtained over the entire surface area of the metal object, no matter how complex the shape of the object.

The base present in the aqueous dispersion may be a volatile base, such as ammonia, or a non-volatile base, such as triethanolamine or an alkali metal hydroxide, such as sodium hydroxide.

The resins utilized in the process of the present invention may be any resins, thermoplastic or thermosetting, which have free acid, e.g. carboxylic acid groups. Resins which are particularly suitable for use in the process of the present invention are alkyd resins and acrylic resins.

With regard to the alkyd resins, these are exemplified by way of alkyd resins made from linseed oil fatty acids, propylene glycol and trimellitic anhydride and if desired an additional small amount of glycerol when large quantities of the linseed oil fatty acids are used. Another type of alkyd resin is one derived from linseed oil fatty acids, glycerol, trimellitic anhydride and butyl carbitol. By varying the quantities of the reactants, alkyd resins may be obtained which have an oil length of 30% to 60%.

The acrylic resins which may be used in the process of the present invention include a copolymer of an amide of a monocarboxylic acid having a single $CH_2=C<$ group, a monocarboxylic acid having a single $CH_2=C<$ group, an alkyl ester of a monocarboxylic acid having a single $CH_2=C<$ group and a monofunctional vinyl aromatic compound. This copolymer may be further blended with an alkoxymethyl aminoplast resin forming a condensate, such as a methoxymethyl melamine ester or methoxymethyl benzoguanamine ether or butylated urea formaldehyde resin. The inclusion of acrylamide in the copolymer recipe is very desirable to achieve the best results in the stoved film but is not essential to the electrodeposition process or its efficiency.

Successful results have been obtained utilizing a range of acrylic copolymers containing 5% or more of methacrylic or acrylic acid.

A 60% solution in butanol of a pigmented acrylic copolymer may be used as the starting material. A stable dispersion of this resin in water is made in the presence of ammonia or triethanolamine, an anionic surface active agent being utilized if necessary.

On immersing metal electrodes in the dispersion, applying a potential difference in the range 60 volts D.C. to 250 volts D.C. and utilizing a current density in the range 0.0002 to 0.4 amps/sq. in., an even adherent film of acrylic copolymer is deposited on the positive electrode, no matter how complicated the shape. When the metallic object constituting this electrode is removed and heated for a period at a temperature in the range 140° to 200° C., a hard adherent film is produced which may be either thermoplastic or non-thermoplastic, depending on the properties of the base acrylic resin.

A class of acrylic resins which can be used to form stable dispersions or emulsions in water in the presence of suitable soluble bases is derived from the copolymerisation in solution of the four following types of monomer:

(i) Acrylamide
(ii) An alkyl acrylate (e.g. butyl or ethyl acrylate)
(iii) Acrylic or methacrylic acid
(iv) Styrene or vinyl toluene Such copolymers are thermoplastic to a greater or lesser degree depending upon their exact compositions. For example, a general trend is for thermoplasticity to increase with decrease in acrylamide content of the copolymer and also with increase in the alkyl acrylate content at the expense of the styrene or vinyl toluene. On stoving films of such copolymers at temperatures of 150° C. to 170° C. thermoplastic flow produces smooth glossy films of even thickness.

If an acrylic copolymer of this type containing at least 10% by weight of acrylamide and at least 5% by weight of acrylic or methacrylic acid, is blended with a reactive resin of the alkoxy methyl aminoplast type, the blend of resins, in the form of a concentrated solution in a suitable solvent, can be converted into a dispersion in water as described above. By the process of electrodeposition previously described, a film of resin can be deposited on the anode which may contain the acrylic and aminoplast resins in the same proportions as in the original blend. On baking such films at temperatures in the range 175° C. to 180° C. for periods of 30 to 60 minutes, inter-reaction of acrylic and aminoplast resins occurs, resulting in the formation of hard, non-thermoplastic films having, among other desirable properties, excellent water, chemical and grease resistance and very good adhesion to metallic substrates.

For the deposition of the film of the pigmented resin on the metal object, the metal object, e.g. plate, is immersed in the aqueous dispersion of the resin to form an anode and a second plate immersed in the aqueous dispersion to form a cathode. A potential difference is then applied to the plates which desirably for the alkyd resin dispersion varies from 20 to 60 volts D.C., producing a current density maximum of about 12 amps/sq. ft. and for the acrylic resin dispersions desirably varies from 20 to 80 volts D.C., producing a maximum current denstiy of the order of 8 to 10 amps/sq. ft. The maximum current density flows for only a short period of time, perhaps 1 or 2 seconds, after which time the current falls off and eventually, e.g. after 10 to 30 seconds reaches a low steady value. The thickness of the deposited film will, of course, depend on the size of the applied voltage.

It is desirable that the deposited film is such that on heating the coated object for a period of time, e.g. stoving the coated object, any retained water can be driven off and, further, that the resin system forming the coating has sufficient plastic flow to produce a uniform and smooth coating. Good plastic flow properties for the resin system are particularly desirable because in the electrophoresis process of the present invention, oxygen is evolved at the anode at the same time that the film is being deposited and therefore gas bubbles are formed in the film of the resin. On heating, e.g. stoving the film, these bubbles will disappear, providing that the resin system has sufficient plastic flow prior to cross-linking. It has been found that alkyd resins have better plastic flow and less tendency to produce the bubbling films than the acrylic resins, although improvement in the plastic flow is brought about in both types of resins by the addition of a small amount of a high boiling material, such as pine oil. The addition helps to keep the film "open" during stoving and allows the craters formed by the bursting of the bubbles in the film to flow out. Improvement in thermoplastic flow may also be brought about, particularly as far as the alkyd resin is concerned, by keeping the viscosity of the resin low and in general it has been found the lower the viscosity of the alkyd resin, the better the flow.

The aqueous resin emulsions used in the process of the present invention desirably have as low viscosity as possible, for if the viscosity of the emulsion is high, carry off of the emulsion itself on the object will be excessive and further washing of the coated object will be necessary. This is wasteful, both from the point of view of the loss of pigmented resin and the need for an extra step in the process of the present invention. In general, if the resin solids content of the emulsion is higher than 20% by weight, the viscosity of the aqueous emulsion exceeds the desirable upper limit. It has been found that with alkyd resins, in order to obtain good deposition of the pigmented resin film, the aqueous emulsion should contain from 10 to 20% by weight of resin solids. Acrylic resin emulsions tend to give a better depostion of the pigmented film on the metal object at lower concentrations than in the case of emulsions of alkyd resins, good results having being obtained at a resin solids content of not more than 10% by weight. Also with acrylic resins, when higher resin solids content of 10% by weight is used, the film of pigmented resin tends to be either too thin at low applied voltages or too thick at high applied voltages.

The aqueous emulsions of the pigmented resins for use in the process of the present invention are relatively stable although the alkyd resin emulsions seem to be more stable than the acrylic resin emulsions. Thus, the alkyd pigmented resin emulsion is reasonably stable for a period of three to four days over which time settlement of the pigmented resin becomes noticeable and the emulsion concontration decreases. After a period of a week or more, the pigmented films obtained from an emulsion are relatively poor. It has been found that the lower the viscosity of the resins, the greater the stability of the emulsions and, further, the addition of surface active agents, such as Lissapol N, improves the stability of the emulsions and increases their useful life. The stability of the emulsion also depends upon the amount of pigment present, and optimum stability is attained at low pigmentations, i.e. 15 to 20% pigment volume concentration. At higher pigmentations, the emulsions tend to be less stable and pigment settlement is more pronounced. A suitable pigment for use in the resins is titanium dioxide.

It will be seen that the invention provides an excellent method of applying a priming coating of a resin based paint to an object of complex shape, since the pigmented resin is deposited as an even film in every nook and cranny of the object. After deposition of the film, the object can be removed from the bath and, on stoving, thermoplastic flow of the pigmented resinous film gives excellent adhesive of the film to the object.

The present invention will be further illustrated by way of the following examples:

Example 1

An acrylic copolymer was prepared having the following composition in proportions by weight:

| | Percent |
|---|---|
| Acrylamide | 10 |
| Methacrylic acid | 10 |
| Butyl acrylate | 50 |
| Styrene | 30 |

The four monomers were copolymerised in butanol solution. The resulting product was a clear viscous copolymer solution having a solids content of 50% by weight. An emulsion of this copolymer was prepared as follows:

| | | |
|---|---|---|
| Acrylic copolymer solution (50% solids) | gm | 50 |
| Tioxide R.H.D. | gm | 40 |
| Butanol | gm | 10 |
| Ammonia (.880 solution) | ml | 10 |
| Water | gm | 400 |

The acrylic resin pigment and butanol were ground together to form a mill base.

The mill base comprising acrylic resin, the ammonia solution and 50 gm. of water were then placed in a tall beaker fitted with a high speed stirrer. The beaker and contents were heated to 50° C. and stirring was commenced until the acrylic resin was completely dispersed. This operation took about 1 to 1½ minutes. The remainder of the water which had also been warmed to 50° C. was now added slowly with continuous stirring. This addition took three minutes and stirring was continued for a further three minutes after all the water had been added.

An electrolytic cell was set up consisting of a flat steel plate having an area of 6 sq. ins., which was made the anode, and a cylindrical cathode having an area of 24 sq. ins. The cell was filled with the emulsion described above so that both electrodes were completely immersed. A potential difference of 66 volts D.C. was applied across the cell and a current passed having an initial value of 1.5 amperes which rapidly fell to 0.1 ampere in under one minute. On removing the anode plate it was found to be covered with an adherent layer of pigmented acrylic resin, this layer covering all parts of the metal surface including the sharp edges of the plate. On heating the coated plate for 30 minutes at 160° C. thermoplastic flow produced a smooth even coating of uniform thickness over all parts of the plate including the sharp edges.

The simple flat metal anode was then replaced by various other metal objects having complex shapes. In all cases smooth even coatings of the pigmented thermoplastic acrylic resin were obtained, even sharp edges on the objects being well covered.

Example 2

| | | |
|---|---|---|
| Acrylic copolymer solution (50% solids in butanol | gms | 50 |
| Butylated melamine formaldhyde resin (50% solids in butanol) | gms | 10 |
| Tioxide R.H.D. | gms | 40 |
| Butanol | gms | 10 |
| Water | gms | 400 |
| Ammonia (.880) | ml | 10 |

The acrylic and melamine formaldehyde resins were blended together until a homogeneous solution was formed. The homogeneous solution, pigment and butanol were ground together to form a mill base. This mill base was then dispersed in water by the method described in Example 1. Electrodeposition in this case required a potential difference of 200 volts D.C. and the current fell from an initial value of 0.6 to 0.1 ampere in two minutes utilising an anode having an area of 6 sq. ins.

On force drying the coated metal anode at 175° C. for 30 minutes a hard non-thermoplastic film was obtained which had excellent adhesion to the metal substrate and good water, chemical and grease resistance.

Example 3

An acrylic copolymer of the type described in Example 1 was reacted with paraformaledhyde, in the presence of triethylamine as a catalyst, to produce N-methylol groups in the copolymer.

| | Gms. |
|---|---|
| Acrylic copolymer (50% solids in butanol) | 200 |
| Paraformaldehyde | 10 |
| Triethylamine | 1 |

The reactants were charged into a three necked flask fitted with a stirrer, reflux condenser and thermometer. The flask was heated until the mixture came up to reflux at 116° C. and was kept refluxing for a further two hours. The resulting solution consisted of a viscous solution in butanol of copolymer containing 54% by weight of solids.

The copolymer was pigmented with tioxide R.H.D. and a dispersion of this copolymer was prepared as described in Example 1 using the same quantities of materials. On carrying out electrodeposition at a potential difference of 66 volts, deposits were obtained on the anode which on stoving at a temperature of 175° C. for 30 minutes, produced pigmented non-thermoplastic films having good hardness combined with excellent adhesion to metallic substrates.

Example 4

An alkyd resin was prepared by charging 2.1 moles of trimellitic anhydride, 4.4 moles of propylene glycol and 1.7 moles of linseed oil fatty acids into a three necked round bottom flask fitted with a stirrer, thermometer and water heater and heated up to a final temperature of 200° C. nitrogen being bubbled through the hot resin until a viscosity of 20 poises (75 solids in Cellosolve acetate) and an acid value of 34 (mg. KOH per gram solid resin) was obtained.

An aqueous emulsion was then made up from the following components in the amounts specified.

| Component: | Parts by weight |
|---|---|
| Tioxide R.H.D. | [1] 45.0 |
| Alkyd resin (75% solids) | [1] 55.0 |
| Methyl ethyl ketone | [1] 5.0 |
| Paralac 6001 U/F resin | 18.3 |
| 37/1 CoN | 0.5 |
| Pine oil | 7.5 |
| 0.880 NH$_3$ | 2.5 |
| Water | 300.0 |

[1] Mill base.

Firstly a mill base was made up by grinding the pigment and alkyd resin in the ketone.

The U/F resin, pine oil and drier are added to the mill base and stirred in thoroughly with a mechanical stirrer. The ammonia and half of the water are then added and the mixture is stirred rapidly for a minute or two until a smooth cream is formed. This is then transferred to a Turrax high speed emulsifier and the rest of water is added over a period of 1½ to 2 minutes while stirring on setting 2–3. After all of the water has been added the stirring is continued for a further 8 to 10 minutes on setting 3–4. The emulsion had a pH of 8–8.5. The emulsion was then inserted in an electrodeposition cell under the conditions specified in Tables 1 and 2, and the results specified in Tables 1 and 2 were obtained. In these tables the resin films were stoved at 135 to 140° C. for 30 minutes and the condition of the paint film prior to and after stoving was recorded.

TABLE 1

| Voltage | Time of immersion (secs.) | Condition of resin film Before stoving | Condition of resin film After stoving | Thickness of paint film (thousandths of an inch) |
|---|---|---|---|---|
| 1 | 20 | 10 | Very thin with specks | Smooth | 0.1-0.3 |
| 2 | 20 | 20 | Smooth with specks | do | 0.2-0.4 |
| 3 | 20 | 40 | Smooth but slight pimples. | do | 0.3-0.4 |
| 4 | 20 | 60 | Smooth, more pimples | do | 0.3-0.4 |
| 5 | 40 | 10 | Smooth with few pits | do | 0.3-0.4 |
| 6 | 40 | 20 | Pitting more pronounced | do | 0.4-0.6 |
| 7 | 40 | 40 | Encrusting commencing | do | 0.6-0.7 |
| 8 | 40 | 60 | Thick coat, encrusting slightly worse. | do | 0.7-0.8 |

TABLE 2

| Voltage | Time of immersion (secs.) | Condition of paint film Before stoving | Condition of paint film After stoving | Thickness of paint film (thousandths of an inch) |
|---|---|---|---|---|
| 1 | 60 | 10 | Encrusted | Slight orange peel. | 0.8 average. |
| 2 | 60 | 20 | do | do | 1.0 average. |
| 3 | 60 | 40 | do | do | 1.5 average. |
| 4 | 60 | 60 | do | do | 1.5 average. |
| 5 | 75 | 10 | Crazed | do | 0.8 average. |
| 6 | 75 | 20 | Crazed and pimpled | do | 1.2 average. |
| 7 | 75 | 40 | Encrusted and pimpled | do | 1.6 average. |
| 8 | 75 | 60 | Encrusted | do | 2.0 average. |

Example 5

An alkyd resin was prepared by charging 2.15 moles of trimellitic anhydride, 4.4 moles of propylene glycol and 1.5 moles of linseed oil fatty acids into a three necked round bottom flask fitted with a stirrer, thermometer and water heater and heated to a final temperature of 200° C.; nitrogen being bubbled through the hot resin until a viscosity of 20 poises (75% solids in Cellosolve acetate) and an acid value of 41 (mg. KOH per gram solid resin) was obtained. An emulsion having the following composition was then made up:

| Component: | Parts by weight |
|---|---|
| Tioxide R.H.D. | 45.0 |
| Alkyd resin (75% solids) | 50.0 |
| Methyl ethyl ketone | 10.0 |
| Paralac 6001 U/F resin | 18.0 |
| 37/1 CoN | 0.5 |
| Pine oil | 5.0 |
| .880 $NH_3$ | 2.5 |
| Water | 300.0 |

The mill base was made up in a similar manner to that of Example 4 and the emulsion made up in a similar manner to that in Example 4. The pH of the emulsion was 8.5.

The aqueous emulsion was put in an electrodeposition cell under the conditions given in Tables 3 and 4, and the results specified in Tables 3 and 4 were obtained.

TABLE 3

| Voltage | Time of immersion (secs.) | Condition of paint film Before stoving | Condition of paint film After stoving at 135° C. to 140° C. for 30 mins. | Thickness of paint film (thousandths of an inch) |
|---|---|---|---|---|
| 1 | 10 | 20 | Very little paint smooth | Smooth | 0.1-0.2 |
| 2 | 20 | 20 | do | do | 0.1-0.2 |
| 3 | 20 | 40 | do | do | 0.2-0.3 |
| 4 | 20 | 60 | do | do | 0.2-0.3 |
| 5 | 40 | 10 | Thicker coat smooth | do | 0.3-0.4 |
| 6 | 40 | 20 | do | do | 0.4-0.5 |
| 7 | 40 | 40 | do | do | 0.4-0.6 |
| 8 | 40 | 60 | do | do | 0.5-0.7 |

TABLE 4

| Voltage | Time of immersion (secs.) | Condition of paint film Before stoving | Condition of paint film After stoving at 135° C. to 140 C. for 30 mins. | Thickness of paint film (thousandths of an inch) |
|---|---|---|---|---|
| 1 | 60 | 10 | Coralline | Coralline | 0.8 average. |
| 2 | 60 | 20 | do | do | 1.4 average. |
| 3 | 60 | 40 | Rough and coralline | do | 0.8 average. |
| 4 | 60 | 60 | do | do | 1.4 average. |
| 5 | 75 | 10 | do | do | 1.2 average. |
| 6 | 75 | 20 | do | do | 1.4 average. |
| 7 | 75 | 40 | do | do | 1.2 average. |
| 8 | 75 | 60 | do | Rough and coralline. | 1.5 average. |

Example 6

An acrylic resin was made as follows:

A three necked flask was fitted with a stirrer, reflux condenser and nitrogen inlet and heating was effected by electrical isomandrel. The following reactants were used.

| Component: | Parts by weight |
|---|---|
| Acrylamide | 10 |
| Methacrylic acid | 10 |
| Butyl acrylate | 50 |
| Styrene | 30 |
| Di-tertiary butyl peroxide | 1.6 |
| t-Dodecyl mercaptan | 1.0 |
| Butanol | 100 |

The reactants including the peroxide and mercaptan were charged into a flask and the mixture was stirred with heating for 20 to 25 minutes until the acrylamide went into solution and the temperature raised to 100° C. The dodecyl mercaptan and two-thirds of the peroxide were then added and mixture stirred up to reflux at a temperature of 118 to 120° C. The mixture was refluxed in an atmosphere of nitrogen and the remaining catalyst. 0.5% was then added and the mixture was refluxed for a further 4 to 5 hours until the solids content of the solution rose to 0.8%, corresponding to a conversion of polymer of 95 to 97%. The polymer so produced was then isolated.

The acrylic emulsion was then made up from this polymer, having the following recipe:

| Component: | Parts by weight |
|---|---|
| Tioxide R.H.D. | 50.0 |
| Acrylic copolymer (50% solids) | 100.0 |
| Paralac 6001 U/F (60% solids) | 20.0 |
| Pine oil | 5.0 |
| Butanol | 10.0 |
| .880 $NH_3$ | 7.0 |
| Water | 600.0 |

The emulsion had a pH of 8 to 8.5. The making of solution was similar to that in Example 4, i.e. a tioxide R.H.D. and the acrylic copolymer and butanol were ball milled to a finishing coat grind (7–8 on 0.002 gauge) and U/F resin and the pine oil were blended in thoroughly. The resulting base was emulsified in water in the presence of ammonia. Films were deposited from this emulsion at a potential difference in the range 20 to 18 volts D.C., the maximum current density being from 8 to 10 amps/sq. ft. Films deposited had similar properties to the films formed from the alkyd resins.

Example 7

An acrylic resin was made in a similar manner to Example III from the following ingredients:

| Component: | Parts by weight |
|---|---|
| Acrylamide | 10 |
| Methacrylic acid | 10 |
| Butyl acrylate | 40 |
| Styrene | 40 |
| Di tertiary butyl peroxide | 1.5 |
| t-Dodecyl mercaptan | 1.0 |
| Butanol | 100 |

An emulsion was then made up in a similar manner to Example 6 having the following recipe:

| Component: | Parts by weight |
|---|---|
| Tioxide R.H.D. | 50.0 |
| AC/EA 76 (50% solids) | 100.0 |
| Paralac 6001 U/F (60% solids) | 20.0 |
| Pine oil | 5.0 |
| Butanol | 10.0 |
| .880 $NH_3$ | 12.0 |
| Water | 600.0 |

The pH of the emulsion was 8.5 when deposition was effected as in Example 6 of the resin film similar results were obtained as in Example 6.

We claim:

1. A process for the deposition of a film of a pigmented resin on a metal object which comprises incorporating a pigment into an acrylic resin having free ionic acid groups which is a copolymer of acrylamide, an alkyl acrylate, a member selected from the group consisting of acrylic acid and methacrylic acid and a member selected from the group consisting of styrene and vinyl toluene, dispersing the pigmented resin in an aqueous medium containing a base to form an aqueous dispersion of said pigmented resin, forming an electrolytic cell using the metal object as the anode of said cell and subjecting the aqueous dispersion to electrophoresis whereby to deposit the pigmented resin on the metal object as an adherent film.

2. A process for the deposition of a film of a pigmented resin on a metal object which comprises blending a mixture of copolymer of acrylamide, an alkyl acrylate, a member selected from the group consisting of acrylic or methacrylic acid and a member selected from the group consisting of styrene or vinyl toluene with an amino plast resin selected from the group consisting of a methoxy-methyl melamine ester and a methoxymethyl benzoguanamine ether, said mixture containing free ionic acid groups incorporating a pigmented blend in an aqueous medium containing a base to form an aqueous dispersion of said pigmented blend, forming an electrolytic cell using the metal object as the anode of said cell and subjecting the aqueous dispersion to electrophoresis whereby to deposit the pigmented blend on the metal object as an adherent film.

3. A process for the deposition of a film of a pigmented resin on a metal object which comprises grinding a pigment with a plurality of resins, which have free ionic acid groups, including a concentrated solution of an acrylic resin which is a copolymer of acrylamide, an alkyl acrylate, a member selected from the group consisting of acrylic acid or methacrylic acid and a member selected from the group consisting of styrene and vinyl toluene, dispersing the pigmented resin in an aqueous medium containing a base selected from the group consisting of ammonia or an alkali metal hydroxide to form an aqueous dispersion of said pigmented resin, said base being present in an amount equal at least the stoichiometric equivalent of the acid present in the resin, forming an electrolytic cell using the metal object as the anode of said cell, subjecting the aqueous dispersion to electrophoresis whereby to deposit the pigmented resin on the metal object as an adherent film, removing the coated metal object from the electrolytic cell and stoving the film at elevated temperature.

4. A process for the deposition of a film on a pigmented resin on a metal object as defined in claim 1 wherein the resin solids content of the aqueous dispersion is no more than 10% by weight.

References Cited

UNITED STATES PATENTS

| 2,860,113 | 11/1958 | Bolton et al. | 260—22 |
| 2,941,968 | 6/1960 | McKenna | 260—23 |
| 2,992,197 | 7/1961 | Boller | 260—22 |
| 3,200,057 | 8/1965 | Burnside et al. | 204—181 |
| 3,200,058 | 8/1965 | Oster | 204—181 |
| 3,230,162 | 1/1966 | Gilchrist | 204—181 |
| 1,294,627 | 2/1919 | Davey | 204—181 |
| 2,206,090 | 7/1940 | Haggenmacher | 204—181 |
| 2,337,972 | 12/1943 | Clayton | 204—181 |
| 2,530,366 | 11/1950 | Gray | 204—181 |
| 2,800,446 | 7/1957 | Fredenburgh | 204—181 |
| 2,820,752 | 1/1958 | Heller | 204—181 |
| 2,898,279 | 8/1959 | Metcalfe et al. | 204—181 |

(Other references on following page)

OTHER REFERENCES

North, A. G., "Water-Dilutable Stoving Finishes," Oil and Colour Chemists Association Journal, vol. 44, No. 2, pp. 119–120, February 1961.

Fink, The Electrochemical Society, "Deposition of Synthetic Resins," vol. 94, No. 6, December 1948, pp. 309–340.

HOWARD S. WILLIAMS, *Primary Examiner.*

JOHN R. SPECK, MURRAY TILLMAN, JOHN H. MACK, *Examiners.*

J. BATTIST, L. G. WISE, E. ZAGARELLA,
*Assistant Examiners.*